United States Patent

Hellbergh

[11] Patent Number: 5,931,369
[45] Date of Patent: Aug. 3, 1999

[54] METHODS AND APPARATUS FOR ALIGNING BAND SAW BLADE FOR STRIP ENDS

[75] Inventor: Håkan Hellbergh, Brandford, Conn.

[73] Assignee: Sandvik Aktiebolag, Sandviken, Sweden

[21] Appl. No.: 08/885,349

[22] Filed: Jun. 30, 1997

[51] Int. Cl.⁶ .............................. B23K 31/02; B23K 37/04
[52] U.S. Cl. ...................... 228/103; 228/212; 228/44.3; 269/43
[58] Field of Search ............................. 228/103–105, 228/212, 44.3; 269/37, 43

[56] References Cited

U.S. PATENT DOCUMENTS

| | | | |
|---|---|---|---|
| 353,245 | 11/1886 | Black | 228/44.3 |
| 423,614 | 3/1890 | Maddox | 228/44.3 |
| 495,881 | 4/1893 | Emerson | 228/44.3 |
| 735,574 | 8/1903 | Ott | 228/44.3 |
| 1,491,297 | 4/1924 | Galbos | 228/44.3 |
| 4,342,450 | 8/1982 | Maddock | 269/87 |
| 4,675,495 | 6/1987 | Kielbania et al. | 219/97 |

*Primary Examiner*—Samuel M. Heinrich
*Attorney, Agent, or Firm*—Burns, Doane, Swecker & Mathis, L.L.P.

[57] ABSTRACT

Device and method for aligning bandsaw blade strip ends prior to welding, comprising at least six displacement sensors disposed on a welding apparatus for measuring locations of two strip ends relative to a reference line, a microcomputer which calculates, from the sensor measurements, the position, direction and curvature of each strip end at the weld line, and a display showing whether the difference of position and direction between the strip ends is within predetermined limits.

6 Claims, 1 Drawing Sheet

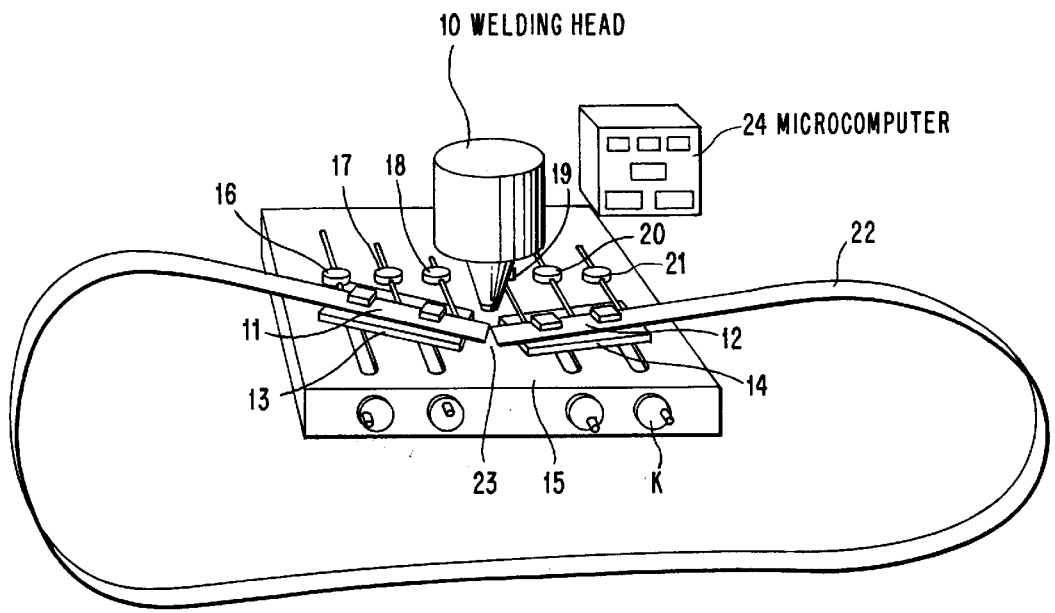
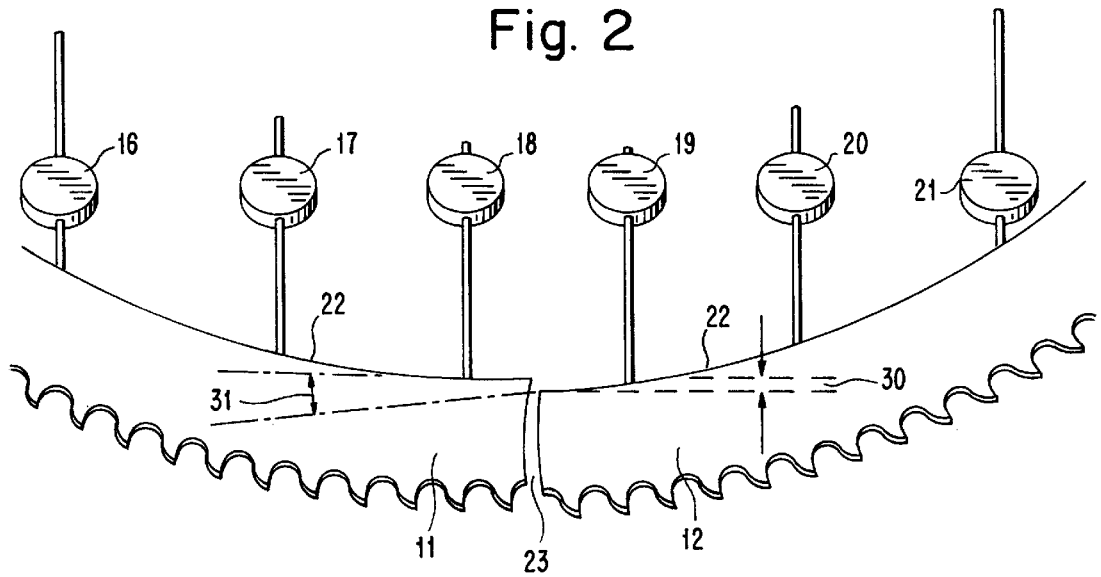

METHODS AND APPARATUS FOR ALIGNING BAND SAW BLADE FOR STRIP ENDS

BACKGROUND OF THE INVENTION

The invention relates to bandsaw blades and in particular to the aligning of bandsaw blade strip ends prior to welding.

Bandsaw blades are generally made by welding appropriate lengths of toothed steel strips into loops fitting a bandsaw machine. In the bandsaw machine the bandsaw blade runs over two large pulleys, and sawing of the work material occurs along one of the straight stretches approximately midway between the pulleys. For narrow bandsaw blades such as used for sawing metal and in the furniture industry, the resistance to torsion is so low, that it is necessary to position saw blade guides immediately below and above the work material, for supporting the bandsaw blade on its sides as well as on its rear toothless edge. For proper operation it is important that the welded joint be as straight as the rest of the bandsaw blade, with no step or angular change disposed therein.

In many cases the toothed strip is manufactured straight, so aligning the ends before welding them together is rather easy. With modern high strain bandsaws, especially for metal sawing, however the strip is deliberately made with a slightly shorter rear edge to offset the effect of letting the toothed front edge run outside the pulleys. This makes the band have a curvature in its plane, called camber, when it is not under tension in the machine. The amount of camber may be chosen with reference to the width of the strip and the expected work load. This makes alignment of the strip ends very difficult.

The present invention relates to a method and apparatus for ensuring that the strip ends are aligned as to position and direction when welding them together.

SUMMARY OF THE INVENTION

The present invention relates to a method for aligning two bandsaw blade strip ends prior to welding the strip ends along a weld line. The method comprises the steps of:

A) measuring the position of at least three points along an edge of each strip end relative to a baseline, B) calculating as linear combinations of those measurements the position and direction of the strip end where it reaches the weld line assuming that each strip end has constant curvature from the weld line past the three measuring points, C) calculating and displaying the differences in position and direction of the two strip ends, and D) manipulating at least one strip end until the differences are less than a predetermined limit.

The invention also relates to an alignment apparatus for determining a positional relationship between two bandsaw blade strip ends at a weld line where the strip ends are to be welded together. The apparatus comprises blade holders having clamps for supporting the strip ends adjacent one another, and two groups of displacement sensors. Each group of sensors comprises at least three sensors arranged for measuring a position of a respective strip end relative to a baseline at three respective points along the strip end, and generating corresponding strip position signals. A calculating unit is electrically connected to the sensors for receiving the strip position signals and comparing those signals for determining a difference in position and direction of the strip ends at the weld line. The calculating unit includes displays for displaying such differences.

BRIEF DESCRIPTION OF THE DRAWING

The objects and advantages of the invention will become apparent from the following detailed description of preferred embodiments thereof in connection with the accompanying drawings in which like numerals designate like elements and in which:

FIG. 1 is a perspective view of a measuring table to which two bandsaw blade strip ends are mounted, according to the present invention; and FIG. 2 is an enlarged view of a fragment of FIG. 1 showing six displacement sensors engaging the strip ends.

DETAILED DESCRIPTION OF PREFERRED EMBODIMENTS OF THE INVENTION

Depicted in FIG. 1 is a welding apparatus which includes a welding table (15) and a welding head (10). Each strip end (11,12) of a bandsaw blade is clamped to a respective holder (13,14) mounted on the welding table (15). Mounted on the table are at least six linear measuring gauges (16–21) of a known type capable of measuring the lateral displacements of respective points on the rear (toothless) edge (22) of the strip relative to a baseline (reference line) on the table. The gauges are arranged symmetrically with respect to a weld line (23) where the strip ends (11,12) meet below the welding head (10), there being at least three measuring gauges disposed along each strip end. The readout of the gauges is connected to a microcomputer (24) having a display.

The linear gauges (16–21) could be Series 543 gauges sold by Mitutoyo.

For each strip end, it is assumed that the camber is constant from the weld line (23) to the most distant measuring point. When the measuring points are known, the microcomputer can then calculate, for each strip end: (i) a camber, (ii) an angular deviation from the baseline at the weld line, and (iii) a lateral displacement from the baseline at the weld line. From those values, the microcomputer can compute the angular difference (31) and the lateral difference (30) at the weld line (23). The strip ends can then be released from the holders (13,14) and manually manipulated until the strip ends are aligned, i.e., until the differences are zero or smaller than specified (reference) tolerances. The manipulating can be done under the guidance of a display of the microcomputer (24). Alternatively, the holders could be made movable on the table (15) whereby instead of releasing the strip ends from the holders, the holders themselves could be moved, either by knobs K or by an automatic mechanism (not shown), in order to align the strip ends.

As a check, the camber of both strip ends can also be displayed, to warn the operator if there is a large difference which may indicate uneven strip properties.

As shown in FIG. 2 the measuring gauges (16–21) are used to measure the position of the rear edge of the strip ends at least at six measuring points, symmetrically located relative to the weld line (23), but not necessarily at even intervals. The position, direction and camber of the left strip end (11) are calculated from the measurements of the three gauges (16–18) from right to left (in FIG. 2) as a linear sum, with the measurements being weighted as a function of distances between the measuring points and the weld line (23). For the right strip end (12), the position, direction and camber are calculated from measurements of the three gauges (19–21) from left to right in the same way as described above.

The weight given to each measurement can be easily calculated when the intervals between the measuring gauges are known. As an example, if the distances from the weld line are 1, 2 and 3 units, respectively, the position at the weld is calculated as 3 A−3 B+C, the direction at the weld as −2.5 A+4 B−1.5 C, and the camber as 0.5 A−B+0.5 C where A, B and C are the measurements. For best accuracy it is desirable to put the middle gauge (17,20) on each strip end not midway between the other two gauges, but slightly closer to the weld line, the exact amount depending on how a directional misfit is rated compared to a positional step. This will alter the relative weights somewhat. Using a higher precision gauge at the inner positions (18,19) located closest to the weld line also improves the accuracy. Preferably, the middle gauge (17 or 20) should be located at a distance from the inner gauge (18 or 19) of 33 to 50% of the distance between the inner gauge (18 or 19) and outer gauge (16 or 21).

The measurements can be conveyed to the display of the microcomputer (24) as analog or digital signals. The display should preferably use digital numbers, accompanied by green and red lights to indicate whether the strip ends are meeting each other at the weld line with better or worse fit than a preset limit. The limits can be varied depending on the dimensions and intended use of the bandsaw.

While the disclosed preferred embodiment relates to the welding together of strip ends of a single strip (to form a loop), the invention could also be used to weld together the strip ends of different strips in order to form a long strip element that is to be coiled for shipment.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Method for aligning two bandsaw blade strip ends prior to welding the strip ends together along a weld line, comprising the steps of:

A) measuring the position of at least three points along an edge of each strip end relative to a baseline, B) calculating, as linear combinations of those measurements, the position and direction of the strip end where it reaches the weld line assuming that each strip end has constant curvature from the weld line past the three measuring points, C) calculating and displaying on a display screen the differences in position and direction of the two strip ends, and D) manipulating at least one of the strip ends until the differences are less than a predetermined limit.

2. Method according to claim 1, further including the step of calculating and displaying the curvature of each strip end.

3. Method according to claim 1, including the step of locating the at least three points of each strip end symmetrically with respect to the weld line.

4. Method according to claim 3, including the step of locating a middle one of the at least three points on each strip end closer to an innermost one of the points than to an outermost one of the points.

5. The method according to claim 1 wherein step A comprises measuring the positions of strip ends of one strip.

6. The method according to claim 1 wherein step A comprises measuring the positions of strip ends of respective strips.

* * * * *